United States Patent
Friederich et al.

(10) Patent No.: US 6,624,747 B1
(45) Date of Patent: Sep. 23, 2003

(54) METHOD FOR PREVENTING THE COLLISION OF A VEHICLE WITH AN OBSTACLE LOCATED IN FRONT OF THE VEHICLE AND BRAKING DEVICE

(75) Inventors: Michael Friederich, Lorch (DE); Markus Hartlieb, Walddorfhaeslach (DE); Harald Kroeger, Stuttgart (DE); Heinz-Werner Spaude, Aichtal (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/622,442

(22) PCT Filed: Feb. 10, 1999

(86) PCT No.: PCT/EP99/00880

§ 371 (c)(1),
(2), (4) Date: Oct. 13, 2000

(87) PCT Pub. No.: WO99/42973

PCT Pub. Date: Aug. 26, 1999

(30) Foreign Application Priority Data

Feb. 18, 1998 (DE) .......................................... 198 06 687

(51) Int. Cl.[7] .................................................. B60Q 1/00
(52) U.S. Cl. ........................ 340/436; 340/435; 340/903; 701/301; 180/271; 342/71
(58) Field of Search .................................. 340/436, 435, 340/903, 439; 701/70, 301, 41, 45, 48, 93; 180/275, 282, 271; 342/71

(56) References Cited

U.S. PATENT DOCUMENTS

| | | | |
|---|---|---|---|
| 4,073,359 A | | 2/1978 | Fujiki et al. .................. 180/98 |
| 4,265,489 A | * | 5/1981 | Meinicke ........................ 303/3 |
| 5,357,438 A | * | 10/1994 | Davidian .................... 364/461 |
| 5,432,509 A | * | 7/1995 | Kajiwara .................... 340/903 |
| 5,532,674 A | * | 7/1996 | Michaud ..................... 340/479 |
| 6,017,102 A | * | 1/2000 | Aga ............................. 303/191 |
| 6,021,375 A | * | 2/2000 | Urai et al. .................... 701/301 |
| 6,031,484 A | * | 2/2000 | Bullinger et al. .............. 342/72 |
| 6,087,975 A | * | 7/2000 | Sugimoto et al. ............. 342/70 |
| 6,289,281 B1 | * | 9/2001 | Shinmura et al. ........... 701/301 |
| 6,324,462 B1 | * | 11/2001 | Kageyama ................... 701/93 |

FOREIGN PATENT DOCUMENTS

| | | |
|---|---|---|
| DE | 3637165 | 5/1988 |
| DE | 42 44 183 A1 | 12/1992 |
| EP | 0 473 866 A2 | 1/1991 |
| GB | 2 081 484 A | 8/1981 |
| GB | 2 153 124 A | 1/1984 |

\* cited by examiner

Primary Examiner—Benjamin C. Lee
Assistant Examiner—Phung Nguyen
(74) Attorney, Agent, or Firm—Crowell & Moring LLP

(57) ABSTRACT

In a method for preventing a collision of a vehicle with an obstacle located on its front (such as preferably another vehicle traveling in front of the vehicle), the headway between the vehicle and the obstacle and the difference in speeds of the vehicle and of the obstacle (relative speed) and also the speed and acceleration/deceleration of the vehicle are detected and a collision message and/or a braking operation is triggered as a function thereof. The driver's activity, the state of the road, the loading state and the degree of overlap of the vehicle relative to the obstacle are detected, and from this information, a first headway (D_brake) between the vehicle and the obstacle is calculated, which is the least necessary to avoid a collision of a vehicle with the obstacle by steering the vehicle past the obstacle. In addition, a second headway (D_steer) is calculated, which is the least necessary to avoid a collision by steering the vehicle past the obstacle. Automatic braking is initiated only when the detected headway is smaller than both the first and second calculated headway values, and when the degree of overlap

9 Claims, 1 Drawing Sheet

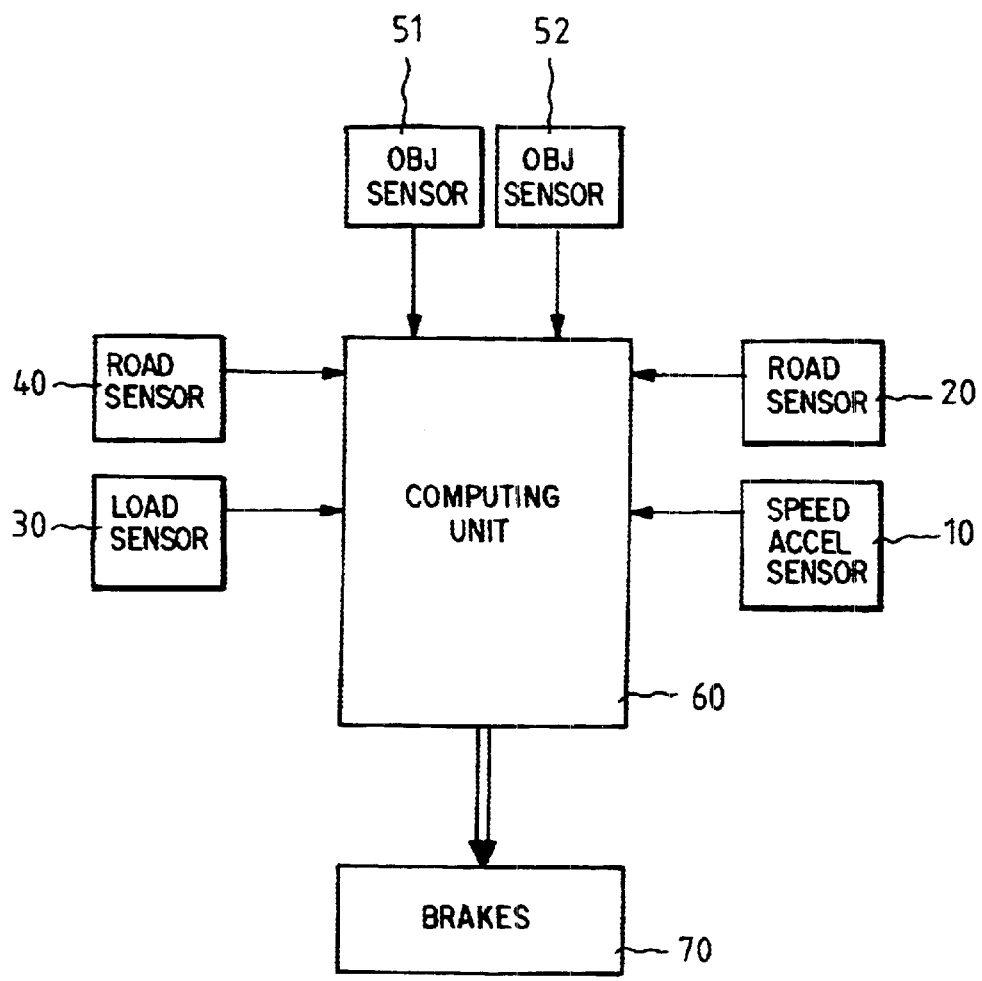

METHOD FOR PREVENTING THE COLLISION OF A VEHICLE WITH AN OBSTACLE LOCATED IN FRONT OF THE VEHICLE AND BRAKING DEVICE

BACKGROUND AND SUMMARY OF THE INVENTION

This application claims the priority of PCT/EP99/00880 filed Feb. 10, 1999 and German patent document 198 06 687.2, filed Feb. 18, 1998, the disclosure of which is expressly incorporated by reference herein.

The invention relates to a method and a braking apparatus for preventing a collision of a vehicle with an obstacle, such as another vehicle located to its front, in which a collision message and/or braking operation is triggered as a function of the headway between the vehicle and the obstacle, the difference in speeds of the vehicle and of the obstacle (relative speed) and also the speed and acceleration or deceleration of the vehicle.

A method of this type may be found, for example, in U.S. Pat. No. 4,073,359, in which data detected by sensors is used to determine whether the vehicle moving at the measured speed and deceleration can still come to a stop in front of the obstacle; that is, within a distance smaller than the headway between the vehicle and the obstacle. If not, an imminent collision is signaled.

In this case, however, neither vehicle-relevant data, such as, for example, the loading state, nor environment-relevant data, such as, for example, the state of the road, are taken into account. Furthermore, there is also no account taken of the driving situation in which the vehicle finds itself.

It has been shown in the past, in particular, that, in the case of heavy commercial vehicles, for example heavy-goods vehicle convoys, or articulated vehicles or in the case of buses, the most frequent type of accident involves a crash into the back of the next heavy-goods vehicle in a line of traffic on the highway. According to representative statistics, no braking maneuver takes place in approximately 40% of these accidents. Even where coaches are concerned, accidents involving rear-impact crashes on motorways often lead to many people being injured or killed. In this case, too, according to representative statistics, there is no braking maneuver in approximately 30% of the accidents.

The apparent reason for such failure to apply the brakes is that vehicles which are stopping or moving slowly are overlooked or not recognized by the driver due to inattention, fatigue or the like. Another cause of accidents is that the vehicle's own speed is not adjusted accordingly when visibility is poor or in darkness. Further causes of accidents are that passing is not possible, for example, when the passing lane is occupied, that the speed of vehicles, particularly those leading on a hill, is wrongly estimated, or that the prescribed safety headway of successive vehicles is not maintained.

Furthermore, in many cases, braking maneuvers in lines of traffic lead to a so-called concertina effect, the result of which is that less reaction and stopping distance is available to the drivers of other following vehicles at an increasing distance of the vehicle from the first braking vehicle.

German patent document DE 42 44 183 C2 discloses a device for assessing a possible collision of a vehicle with an obstacle, in which the travel of a vehicle and the travel of the obstacle are estimated in advance and, when there is the risk of a collision, a collision avoidance mechanism is triggered. In this case, the position which the vehicle would assume and the position which the obstacle would assume after a predeterminable time interval has elapsed are precalculated. The collision avoidance mechanism includes an alarm and a hydraulic generator which can actuate the brakes of the vehicle. This device ignores the activity of the vehicle driver. The actuation of the alarm means and the actuation of the hydraulic generator in a critical situation take place even when, for example, the driver has already taken countermeasures to prevent a collision.

One object of the invention is to provide a method for preventing a collision of a vehicle the above generic type, in which particularly in a line of traffic, a collision message or a braking operation is triggered only from that moment when a collision or an accident involving a rear-impact crash cannot be avoided either by braking or by the vehicle being steered past the obstacle. The method is also to take into account, in particular, the activity of the driver; that is, countermeasures already initiated in a hazardous situation.

This and other objects and advantages are achieved by the collision avoidance method and apparatus according to the invention, in which in addition to the signals detected as above, the driver's activity (particularly accelerator pedal actuation, brake pedal actuation, actuation of the direction indicator and/or the degree of steering lock), the state of the road, the loading state and the degree of overlap of the vehicle relative to the obstacle, are detected. Based on this information, a first headway between the vehicle and the obstacle is calculated, which is the least necessary to make it possible to avoid a collision with the obstacle by means of a braking operation with maximum deceleration. A second headway is calculated, which is the least necessary to make it possible to avoid a collision with the obstacle by steering the vehicle past the obstacle; and automatic braking is initiated only when the detected headway is smaller than both the first and the second calculated headway.

When driver activity takes place, the braking operation can be initiated in the case of a smaller detected or actual headway. At the same time, in an advantageous embodiment of the method, the first headway between the vehicle and the obstacle and the second headway which is necessary to make it possible to avoid a collision with the obstacle by the vehicle being steered passed the obstacle are reduced by a predeterminable amount when:

a) the vehicles still half overlap one another;
b) the direction indicator is actuated and the accelerator pedal is actuated up to a predeterminable threshold value;
c) the direction indicator is actuated and a predetermined steering angle is exceeded; or
d) the brake pedal is actuated up to a predeterminable threshold value.

In all these cases, there is driver activity which implies that either the driver is overcoming a critical driving situation by his own activities or there is no critical driving situation present at all.

Preferably, at the same time, the vehicle is braked with maximum deceleration until the relative speed assumes the value zero.

Moreover, there may advantageously be provision for the brake lights of the vehicle to be switched on before the automatic braking operation is initiated. As a result, the driver of a following vehicle is informed at an early stage of the initiation of the braking manoeuver necessary for overcoming the critical driving situation.

The invention also provides a braking device for a vehicle, comprising at least one sensor for detecting the speed and acceleration/deceleration of the vehicle, at least one sensor for detecting the headway between the vehicle and an obstacle located in front of the vehicle, preferably another vehicle traveling in front of the vehicle, and the difference in speeds of the vehicle and of the obstacle (relative speed), and also a central control unit which automatically actuates a brake as a function of the signals detected by the sensors. In addition, at least one sensor is provided for detecting the driver's activity (in particular accelerator pedal actuation, brake pedal actuation, actuation of the direction indicator and/or the degree of steering angle lock), as well as at least one sensor for detecting the degree of overlap of the vehicle relative to the obstacle, at least one sensor for detecting the loading state and at least one sensor for detecting the state of the road. The output signals from these sensors are supplied to the central control unit for triggering a braking operation and calculating a maximum braking deceleration as a function of the signals emitted by the sensors, when the headway detected by the sensors for detecting the headway between the vehicle and the obstacle located in front of the vehicle is smaller than both a first calculated headway between the vehicle and the obstacle, which is at least necessary to make it possible to avoid a collision of the vehicle with the obstacle by means of a braking operation with maximum deceleration, and a second calculated headway, which is at least necessary to make it possible to avoid a collision of the vehicle with the obstacle by steering the vehicle past the obstacle, and when the degree of overlap detected by the sensors for detecting the degree of overlap exceeds a predetermined threshold.

In an advantageous embodiment, at least one sensor is provided for detecting the headway and the relative speed between the vehicle and an obstacle located in front of the vehicle and the at least one sensor for detecting the degree of overlap to be two radar sensors arranged, spaced apart, on the front side of the vehicle. In this case, these radar sensors can, in a particularly advantageous way, simultaneously assume the function of the sensor for detecting the headway and the relative speed and of the sensor for detecting the degree of overlap.

In order, in particular, to make it possible for the brake to have a very fast response behavior, the brake is advantageously an electronically activatable compressed-air brake.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing is a schematic illustration of a braking device which incorporates the collision avoidance mechanism according to the invention.

DETAILED DESCRIPTION OF THE DRAWINGS

A braking device for a vehicle (not shown), illustrated diagrammatically in the FIGURE3, comprises a sensor 10 for detecting the speed and acceleration/deceleration of the vehicle, one or more sensors 20 for detecting the driver's activity (accelerator pedal actuation, brake pedal actuation, actuation of the direction indicator, and/or the steering angle), a sensor 30 for detecting the loading state, and a sensor 40 which detects the state of the road. Object-detecting sensors 51, 52 detect the headway between the vehicle and an obstacle located in front of the vehicle, (for example another vehicle traveling in front of the vehicle), as well as the difference in speeds of the vehicle and of the other vehicle traveling in front of the vehicle (relative speed) and the degree of overlap. The object-detecting sensors 51, 52 are, for example, radar sensors arranged, spaced apart from one another, on the front side of the vehicle. The output signals from all the sensors are supplied to a central control and computing unit 60, by means of which a compressed-air vehicle brake 70 can be actuated.

An automatic braking operation is triggered (that is, the compressed-air vehicle brake 70 is activated) as a function of the signal detected by the sensors, whenever a collision with the other vehicle traveling in front of the vehicle or a collision with another obstacle can no longer be avoided.

A method for preventing a collision of a vehicle with an obstacle located in front of the vehicle (e.g., another vehicle traveling in front of the vehicle), by the initiation of an automatic braking operation, in conjunction with the braking device illustrated diagrammatically in the Figure, is described below. The speed and acceleration/deceleration of the vehicle are detected and supplied to the central control unit 60 by the sensor 10. In addition, the loading state is detected by the sensor 30 and the state of the road is detected by the sensor 40 (for example, whether the road is dry or wet, the nature of its surface, and the like), and these data are supplied to the central control unit 60. Moreover, by the sensor 20 detects the steering angle, for example by potentiometers or non-contact rotary-angle sensors or the like, and supplies this information to the control unit 60. Furthermore, the relative speed, the headway and the degree of overlap between the vehicle and the other vehicle traveling in front of the vehicle are detected by the two object-detecting sensors 51 and 52 and are supplied to the control unit 60.

The computing unit 60, determines whether the degree of overlap exceeds a predetermined limit; that is, whether the two vehicles are travelling essentially centrally one behind the other. In this case, it may be assumed that the vehicle is in a driving situation involving a line of traffic.

Furthermore, the central control unit 60 calculates a first headway D_brake between the vehicle and the other vehicle traveling in front, which is the least necessary to make it possible to avoid a collision of the vehicle with the further vehicle traveling in front by means of a braking operation with maximum deceleration. A second headway D_steer is calculated, which is the least necessary to make it possible to avoid a collision with the other vehicle by steering the vehicle past this other vehicle.

An exemplary embodiment of the method is explained in more detail below.

If the two object-detecting sensors 51, 52 detect (within given limits) identical signals for the headway and relative speed of the obstacle ahead, and if there is no driver activity, (that is, no actuation of the direction indicator or of the pedals), the criterion for triggering automatic full braking is, with the following definitions Fg1: vehicle 1 (person in front)
Fg2: vehicle 2 (own vehicle)
v1: speed of Fg1
v2: speed of Fg2
a1: acceleration of Fg1
a2: acceleration of Fg2
a2_max: maximum braking capacity of Fg2 (as a function of atmospheric conditions, the state of the road, tire state, etc.)
v_rel: relative speed between Fg1 and Fg2 (=v2−v1)
T_resp: response time of the brake of Fg2

T_delay: measure of the delayed triggering of full braking D: constantly measured actual headway between Fg1 and Fg2

D_brake: constantly calculated headway between Fg1 and Fg2 at least necessary to make it possible to avoid an accident by full braking D_steer: constantly calculated headway between Fg1 and Fg2 at least necessary to make it possible to avoid an accident by steering past:

$$D<D_{13}\text{ brake and }D<D\_\text{steer},$$

where $$D\_\text{brake}=[v\_\text{rel})^2/(2\times(a1-a2\_\text{max}))+v\text{-rel}\times T\_\text{resp}]$$

with $$a2\_\text{max}=a2\_\text{max}-0.001\text{ m/s}^2,\text{ when }a2\_\text{max}=a1.$$

Delayed triggering takes place when activities of the driver are detected. Full braking takes place, in this case, in the event of smaller actual headways, specifically when $$D<D\_\text{brake}-v\_\text{rel}\times T\_\text{delay}$$

and $$D<D\_\text{steer}-v\_\text{rel}\times T\_\text{delay}.$$

Such delayed triggering takes place on the following preconditions:

1. Only one object-detecting sensor 51 or 52 delivers the values for headway and relative speed which require emergency braking according to the trigger criteria illustrated above (=vehicles only approximately half overlap one another) or 2. the direction indicator is actuated and the accelerator pedal is depressed up to a specific threshold value, this being detectable by switches and sensors, for example angle sensors, or 3. the direction indicator is actuated and a predetermined steering angle is exceeded or 4. the brake pedal is actuated up to a specific threshold value.

In this case, D_brake and D_steer are reduced, since it must assumed that the driver is in a position to overcome hazardous situations.

The brake lights of the vehicle are advantageously switched on before emergency braking is triggered, so that the drivers of following vehicles are informed of the hazardous situation at an early stage.

D_steer can be calculated, as a simplest approximation, for example by means of the following formula:

$$D\_\text{steer}=v\_\text{rel}\_T\_\text{steer},$$

in this case the time T_steer meaning the time within which the steering wheel is actuated. It goes without saying that further data relating to vehicle and driving situation elements may be used for calculating D_steer.

The maximum braking deceleration to a relative speed having the value zero is calculated in the central control and computer unit 60 as a function of the signal detected by the sensors.

The abovementioned sensors, for example the sensors 10 for detecting the speed and acceleration of the vehicle, may also be used at the same time for other purposes, for example for anti-lock systems or the like.

The above description relates to an exemplary embodiment of the invention which is used in land vehicles, for example in heavy-goods vehicles, buses or passenger cars. The method on which the invention is based and the device on which the invention is based are not restricted to use in land vehicles, but may also be used, if appropriate in slightly modified form, in other vehicles, such as rail vehicles, watercrafts and aircrafts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for preventing a collision of a vehicle with an obstacle located to its front, in which the headway between the vehicle and the obstacle, relative speed of the vehicle with respect to the obstacle and speed and acceleration/deceleration of the vehicle are detected and a collision message or a braking operation is triggered as a function of this information, said method comprising:

detecting activity of a vehicle driver, the state of the road, the loading state and the degree of overlap of the vehicle relative to the obstacle;

based on this information, calculating a first headway between the vehicle and the obstacle which is a least distance necessary to avoid a collision of the vehicle with the obstacle by means of a braking operation with maximum deceleration;

calculating a second headway which is a least distance necessary to avoid a collision of the vehicle with the obstacle by steering the vehicle past the obstacle; and initiating an automatic braking operation only when the detected headway is smaller than both the first and second calculated headways, and the degree of overlap exceeds a predetermined threshold.

2. The method according to claim 1, wherein said step of detecting activity of the vehicle driver comprises detecting driver evasive actions that are indicative of driver initiated collision avoidance maneuver, including at least one of driver accelerator pedal actuation, brake pedal actuation, of a direction indicator, and a degree of steering angle lock.

3. The method according to claim 2, wherein:

the variables the first headway and the second headway are reduced by a predeterminable amount in response to detection of driver evasive actions; and said driver evasive actions are detected when the vehicles only half overlap one another; or the direction indicator is actuated and the accelerator pedal is actuated up to a predeterminable threshold value; or the direction indicator is actuated and a predetermined steering angle is exceeded; or the brake pedal is actuated up to a predeterminable threshold value.

4. The method according to claim 1, wherein the vehicle is braked with maximum deceleration until the relative speed is zero.

5. The method according to claim 1, wherein said step of initiating automatic braking comprises switching on brake lights of the vehicle before an automatic braking operation is initiated.

6. A braking device for a vehicle, having at least one object-detecting sensor for detecting headway between the vehicle and an obstacle located to its front, and relative speed of the vehicle and the obstacle, and a central control unit which automatically actuates a brake unit as a function of signals detected by the sensors, comprising:

- at least one sensor for detecting activity of a vehicle driver;
- at least one sensor for detecting a degree of overlap of the vehicle relative to the obstacle;
- at least one sensor for detecting a loading state of the vehicle;
- at least one sensor for detecting the state of the road; and
- a central control unit coupled to receive output signals from said sensors, for triggering a braking operation;
- wherein said central control unit calculates a maximum braking deceleration as a function of signals emitted by the sensors, when detected headway between the vehicle and an obstacle located to its front is smaller than both a first calculated headway between the vehicle and the obstacles which is the least distance necessary to avoid a collision of the vehicle with the obstacle by means of a braking operation with maximum deceleration, and a second calculated headway which is the least distance necessary to avoid a collision of the vehicle with the obstacle by steering the vehicle passed the obstacle, and a detected degree of overlap exceeds a predetermined threshold.

7. The braking device according to claim 6, wherein the sensors for detecting activity of a vehicle driver are sensors for detecting at least one of brake pedal actuation, accelerator pedal actuation, actuation of a direction indicator, and a degree of steering angle lock.

8. The braking device according to claim 6 wherein the sensors for detecting the headway and the relative speed, and for detecting the degree of overlaps, are radar sensors arranged, spaced apart, on the front side of the vehicle.

9. The braking device according to claim 6, wherein the brake is an electronically activatable compressed-air brake.

* * * * *